United States Patent
Pham et al.

(10) Patent No.: US 11,481,672 B2
(45) Date of Patent: *Oct. 25, 2022

(54) MACHINE LEARNING SYSTEM AND APPARATUS FOR SAMPLING LABELLED DATA

(71) Applicant: Capital One Services, LLC, McLean, VA (US)

(72) Inventors: Vincent Pham, Champaign, IL (US); Reza Farivar, Champaign, IL (US); Jeremy Goodsitt, Champaign, IL (US); Fardin Abdi Taghi Abad, Champaign, IL (US); Anh Truong, Champaign, IL (US); Mark Watson, Urbana, IL (US); Austin Walters, Savoy, IL (US)

(73) Assignee: CAPITAL ONE SERVICES, LLC, McLean, VA (US)

(*) Notice: Subject to any disclaimer, the term of this patent is extended or adjusted under 35 U.S.C. 154(b) by 288 days.

This patent is subject to a terminal disclaimer.

(21) Appl. No.: 16/423,315

(22) Filed: May 28, 2019

(65) Prior Publication Data
US 2020/0175418 A1    Jun. 4, 2020

Related U.S. Application Data

(63) Continuation of application No. 16/203,833, filed on Nov. 29, 2018, now Pat. No. 10,354,205.

(51) Int. Cl.
*G06N 20/00* (2019.01)
*G06F 16/2457* (2019.01)
*G06N 5/04* (2006.01)

(52) U.S. Cl.
CPC ....... *G06N 20/00* (2019.01); *G06F 16/24573* (2019.01); *G06F 16/24578* (2019.01); *G06N 5/04* (2013.01)

(58) Field of Classification Search
CPC .... G06N 20/00; G06N 5/04; G06F 16/24573; G06F 16/24578
See application file for complete search history.

(56) References Cited

U.S. PATENT DOCUMENTS 5,819,226 A    10/1998    Gopinathan et al.
7,193,968 B1    3/2007    Kapoor et al.
(Continued)

OTHER PUBLICATIONS

Dittman et al., "Selecting the Appropriate Data Sampling Approach for Imbalanced and High-Dimensional Bioinformatics Datasets," 2014 IEEE 14th International Conference on Bioinformatics and Bioengineering, IEEE Computer Society, 2014, pp. 304-310. (Year: 2014).*

(Continued)

*Primary Examiner* — Phuong Thao Cao
(74) *Attorney, Agent, or Firm* — Hunton Andrews Kurth LLP

(57) ABSTRACT

A database including various datasets and metadata associated with each respective dataset is provided. These datasets were used to train predictive models. The database stores a performance value associated with the model trained with each dataset. When provided with a new dataset, a server can determine various metadata for the new dataset. Using the metadata, the server can search the database and retrieve datasets which have similar metadata values. The server can narrow the search based on the performance value associated with the dataset. Based on the retrieved datasets, the server can recommend at least one sampling technique. The sampling technique can be determined based on the one or more sampling techniques that were used in association with the retrieved datasets.

15 Claims, 5 Drawing Sheets

(56) References Cited

U.S. PATENT DOCUMENTS

| | | | |
|---|---|---|---|
| 7,324,991 B1 | 1/2008 | Anjur | |
| 7,747,551 B2* | 6/2010 | Snyder | G16H 40/63 706/20 |
| 8,301,623 B2 | 10/2012 | Chakrabarti et al. | |
| 8,311,967 B1* | 11/2012 | Lin | G06N 20/00 706/45 |
| 8,417,715 B1* | 4/2013 | Bruckhaus | G06Q 10/04 705/26.1 |
| 8,438,122 B1* | 5/2013 | Mann | G06N 20/00 706/12 |
| 8,812,543 B2 | 8/2014 | Kanagasabapathi et al. | |
| 8,843,427 B1* | 9/2014 | Lin | G06N 20/00 705/16 |
| 9,215,142 B1* | 12/2015 | Herold | H04L 43/0817 |
| 9,430,519 B1 | 8/2016 | Cai et al. | |
| 9,582,819 B2 | 2/2017 | Krause et al. | |
| 9,654,503 B1* | 5/2017 | Kowalyshyn | H04L 63/1425 |
| 9,753,968 B1 | 9/2017 | Ronen et al. | |
| 9,775,533 B2 | 10/2017 | Ong et al. | |
| 9,779,187 B1 | 10/2017 | Gao et al. | |
| 10,062,078 B1* | 8/2018 | Boates | G06Q 20/4016 |
| 10,706,848 B1* | 7/2020 | Greene | G06F 3/167 |
| 2004/0042398 A1* | 3/2004 | Peleg | H04L 47/745 370/235 |
| 2004/0073376 A1* | 4/2004 | Gesteland | G16B 40/00 703/11 |
| 2005/0234688 A1 | 10/2005 | Pinto et al. | |
| 2005/0234753 A1 | 10/2005 | Pinto et al. | |
| 2005/0234762 A1 | 10/2005 | Pinto et al. | |
| 2007/0196007 A1* | 8/2007 | Chen | A61B 6/00 382/131 |
| 2008/0319727 A1* | 12/2008 | Horvitz | G06F 9/451 703/13 |
| 2009/0097741 A1 | 4/2009 | Xu et al. | |
| 2009/0187534 A1 | 7/2009 | Broll et al. | |
| 2010/0145567 A1 | 6/2010 | Bian et al. | |
| 2010/0268395 A1* | 10/2010 | Ingemann | G05B 23/024 702/182 |
| 2011/0025525 A1* | 2/2011 | Akimov | E21B 47/12 340/853.2 |
| 2011/0160070 A1 | 6/2011 | Gervais et al. | |
| 2011/0264581 A1 | 10/2011 | Clyne | |
| 2012/0059777 A1 | 3/2012 | Paiva et al. | |
| 2012/0254242 A1* | 10/2012 | Kanagasabapathi | G06Q 30/0201 707/776 |
| 2012/0284213 A1* | 11/2012 | Lin | G06N 3/08 706/12 |
| 2013/0097103 A1 | 4/2013 | Chari et al. | |
| 2014/0095616 A1 | 4/2014 | White et al. | |
| 2014/0129256 A1* | 5/2014 | Veren | G06Q 40/08 705/3 |
| 2014/0279754 A1* | 9/2014 | Barsoum | G06N 20/00 706/12 |
| 2014/0324367 A1 | 10/2014 | Garvey, III et al. | |
| 2014/0351183 A1 | 11/2014 | Germain et al. | |
| 2014/0358440 A1 | 12/2014 | Pyrcz et al. | |
| 2015/0066467 A1 | 3/2015 | Acar et al. | |
| 2015/0095415 A1 | 4/2015 | White et al. | |
| 2015/0142713 A1 | 5/2015 | Gopinathan et al. | |
| 2016/0071217 A1 | 3/2016 | Edwards et al. | |
| 2016/0100322 A1* | 4/2016 | Ekambaram | G06F 11/3466 455/418 |
| 2016/0132787 A1 | 5/2016 | Drevo et al. | |
| 2016/0292856 A1 | 10/2016 | Niemeijer et al. | |
| 2016/0358102 A1 | 12/2016 | Bowers et al. | |
| 2017/0004513 A1 | 1/2017 | Vadakattu et al. | |
| 2017/0006430 A1* | 1/2017 | Chao | G06Q 30/0261 |
| 2017/0083928 A1 | 3/2017 | Gerard et al. | |
| 2017/0109646 A1 | 4/2017 | David | |
| 2017/0132362 A1 | 5/2017 | Skinner et al. | |
| 2017/0132520 A1* | 5/2017 | Burroughs | G06N 5/04 |
| 2017/0242878 A1 | 8/2017 | Maier et al. | |
| 2017/0262275 A1 | 9/2017 | Mohiuddin et al. | |
| 2017/0364561 A1* | 12/2017 | Wu | G06F 16/24578 |
| 2017/0372155 A1 | 12/2017 | Odry et al. | |
| 2018/0075357 A1 | 3/2018 | Subramanian et al. | |
| 2018/0129663 A1 | 5/2018 | Ivanov et al. | |
| 2018/0144352 A1* | 5/2018 | Ram | G06Q 20/10 |
| 2018/0217883 A1 | 8/2018 | Murugan et al. | |
| 2018/0276560 A1* | 9/2018 | Hu | G06N 20/00 |
| 2018/0279563 A1 | 10/2018 | Wolfe et al. | |
| 2018/0314977 A1* | 11/2018 | Jiang | G06Q 40/02 |
| 2018/0322958 A1 | 11/2018 | Kalafatis | |
| 2018/0367561 A1* | 12/2018 | Givental | G06F 21/552 |
| 2019/0087733 A1* | 3/2019 | Dooley | G06N 5/04 |
| 2019/0102277 A1* | 4/2019 | Walenstein | G06N 20/00 |
| 2019/0102693 A1* | 4/2019 | Yates | G06N 20/20 |
| 2019/0236412 A1* | 8/2019 | Zhao | G06K 9/6218 |
| 2019/0272317 A1* | 9/2019 | Wroczynski | G06N 3/088 |
| 2019/0279109 A1* | 9/2019 | Guelman | G06F 16/285 |
| 2019/0354993 A1* | 11/2019 | Ben-Or | G06N 20/20 |
| 2020/0012939 A1* | 1/2020 | Hu | G06N 3/04 |
| 2020/0057958 A1* | 2/2020 | Moore | G06N 20/00 |
| 2020/0072638 A1* | 3/2020 | Ramanath | G06F 17/18 |

OTHER PUBLICATIONS

Morais et al., "A Meta-Learning Method to Select Under-Sampling Algorithms for Imbalanced Data sets", 2016 5th Brazilian Conference on Intelligent Systems, IEEE, 2016, pp. 385-390. (Year: 2016).*

Westfall, L., "Sampling Methods", The WestfallTeam—Partnering for Software Excellence, copyright 2008-2009, 2 pages. (Year: 2009).*

Zhou, L., "Performance of corporate bankruptcy prediction models on imbalanced dataset: The effect of sampling methods", Knowledge-Based Systems 41 (2013), pp. 16-25. (Year: 2013).*

Classification: ROC and AUC, Machine Learning Crash Course, Google Developers; https://developers.google.com/machine-learning/crash-course/clssification/roc-and-auc (4 pages), accessed date Jul. 23, 2018.

Weiss, G. M. et al.; "Cost-Sensitive Learning vs. Sampling: Which is Best for Handling Unbalanced Classes with Unequal Error Costs?", Department of Computer and Information Science, Fordham University (7 pages).

"How to handle Imbalanced Classification Problems in machine learning?", Guest Blog, Mar. 17, 2017; https://analyticsvidhya.com/blog/2017/03/imbalanced-classification-problem/ (15 pages).

Amazon Machine Learning Developer Guide (145 pages), Last documentation date Aug. 2, 2016.

Model Selection, https://frnsys.com/ai_notes/machine_learning/model_selection.html (17 pages), accessed date Jul. 23, 2018.

ROC curves and Area Under the Curve explained, Data School, Nov. 19, 2014, https://www.dataschool.io/roc-curves-and-auc-explained/ (19 pages).

Fawcett, T.; "An introduction to ROC analysis", Pattern Recognition Letters 27(2006) pp. 861-874, www.elsevier.com/locate/patrec (14 pages).

Poshala, P., "Why Oversample when Undersampling can do the Job?", Texas Instruments, Application Report SLAA594A—Jun. 2013—Revised Jul. 2013 (12 pages).

Padmaja et al., "Majority Filter-based Minority Prediction (MFMP): An Approach for Unbalanced Datasets", TENCON 2008—2008 IEEE Region 10 Conference, Nov. 19-21, 2008, Hyderabad, India, 6 pages. (Year: 2008).

Wang et al., "Understanding Graph Sampling Algorithms for Social Network Analysis", 2011 31st International Conference on Distributed Computing Systems Workshops, IEEE Computer Society, 2011, pp. 123-128. (Year: 2011).

Balamurugan et al., "Analyse the Performance of Ensemble Classifiers Using Sampling Techniques", ICTACT Journal on Soft Computing, Jul. 2016, vol. 06, Issue 04, pp. 1293-1296. (Year: 2016).

Miranda et al., "Using a Many-Objective Optimization Algorithm to Select Sampling Approaches for Imbalanced Datasets", 2018 IEEE

(56) References Cited

OTHER PUBLICATIONS

Congress on Evolutionary Computation (CEC), Jul. 8-13, 2018, Rio de Janeiro, Brazil, IEEE, 7 pages. (Year: 2018).
Ng et al., "In Search of an Optimum Sampling Algorithm for Prediction of Soil Properties from Infrared Spectra", in PeerJ, vol. 6, e5722, published Oct. 3, 2018, 27 pages. (Year: 2018).

* cited by examiner

Dataset (100)

| Variables (101) | Age (102) | Family History (103) | Cancer (104) |
|---|---|---|---|
| 1 | 39 | 0 | 0 |
| 2 | 46 | 1 | 1 |
| 3 | 40 | 1 | 0 |
| 4 | 74 | 1 | 1 |
| 5 | 22 | 0 | 0 |
| 6 | 87 | 0 | 0 |
| 7 | 38 | 0 | 0 |
| 8 | 42 | 1 | 1 |
| 9 | 24 | 1 | 0 |
| 10 | 28 | 1 | 0 |
| ... | ... | ... | ... |
| 1000 | 88 | 1 | 1 |

*FIG. 1*

MACHINE LEARNING SYSTEM AND APPARATUS FOR SAMPLING LABELLED DATA

CROSS REFERENCE TO RELATED APPLICATION

The subject application is a Continuation of Ser. No. 16/203,833 filed Nov. 29, 2018, now U.S. Pat. No. 10,354,205, the contents of which is hereby incorporated by reference in its entirety.

BACKGROUND

Machine learning uses statistical techniques for teaching computers with data to perform specific tasks without being explicitly programmed to do so. The goal of machine learning is to construct algorithms that can learn from and make predictions on data. These algorithms work by creating mathematical models which can classify data. The process of creating the models can involve training and fine tuning the model parameters using input data.

SUMMARY

Training classification models is a cumbersome and time-consuming process. In particular, many training datasets can be imbalanced (or skewed) and require sampling prior to feeding the dataset to the machine learning algorithm for training a model, e.g., a classification model. The only way to determine whether a sampling technique can effectively sample data for training a classification model is trial and error. In other words, one has to feed a dataset sampled according to the sampling technique to the machine learning algorithm and test the trained model for accuracy to determine whether the sampling is effective. This process is time-consuming and resource intensive. At the same time, there are many different sampling techniques that can be implemented on a dataset, and these sampling techniques can be even combined to create other sampling techniques. Therefore, an object of this disclosure is to address the technical problems associated with determining the appropriate sampling technique for a dataset used for training a classification model.

A database including various datasets and metadata associated with each respective dataset is provided. These datasets were used to train predictive models. The database stores a performance value associated with the model trained with each dataset. When provided with a new dataset, a server can determine various metadata for the new dataset. Using the metadata, the server can search the database and retrieve datasets which have similar metadata values. The server can narrow the search based on the performance value associated with the dataset. Based on the retrieved datasets, the server can recommend at least one sampling technique. The sampling technique can be determined based on the one or more sampling techniques that were used in association with the retrieved datasets.

BRIEF DESCRIPTION OF THE DRAWINGS

FIG. 1 shows a dataset including variables and features according to an example embodiment.

DETAILED DESCRIPTION

Figure 2:
FIG. 2 shows a confusion matrix for a cancer detection model according to an example embodiment.

In some embodiments, a dataset is provided for creating a model. The dataset can be divided into several sub-datasets. For example, the dataset can be divided into a training dataset, a validation dataset and a test dataset. In one example embodiment, 70 percent of the data in the dataset can be placed in the training dataset, 20 percent of the data can be placed in the validation dataset and 10 percent of the data can be placed in the test dataset. In general, however, no specific ratio for the datasets are required.

In some embodiments, multiple datasets are used at different stages of creating classification models. These datasets can include a training dataset, a validation dataset and a test dataset. Initially, the training dataset can be used to fit the parameters of the model. The training dataset can include an input vector and the corresponding answer vector (or the target or label). In this stage, the training dataset is fed to the model and the model produces a result set, which can be compared with the target. Based on this comparison, the parameters of the model can be adjusted. After adjusting the parameters of the model, a validation dataset can be fed into the model to further refine the parameters of the model. The validation dataset provides an unbiased evaluation of the model fit on the training dataset while tuning the model's hyperparameters. Finally, the test dataset can be used to provide an unbiased evaluation of a final model fit on the training dataset. Yet in other embodiments, there is no need for training a model using the datasets as described above because fewer or more datasets can be used to train the model.

Imbalanced Dataset

Although in theory any training dataset can enable a machine learning algorithm to adjust a model for accurate predictions, in practice, some training datasets are inadequate for certain applications. For example, datasets that are imbalanced or include a skewed class distribution are examples of datasets which can be insufficient for training classification models. In these datasets, there usually is a majority class and at least one minority class, and the number of majority class members can significantly exceed those of the minority class members. This phenomenon often occurs in fraud detection, medical diagnosis or spam classification applications. For example, in fraud detection applications, for every fraudulent transaction, there can be hundreds or even thousands of properly authorized transactions. As another example, in medical diagnosis cases, the number of patients with a rare abnormality can be far fewer than the number of healthy patients. As such, a dataset of financial transactions or medical files can be imbalanced.

Machine learning algorithms tend to produce unsatisfactory models when trained with imbalanced training datasets because an imbalanced training dataset does not provide the necessary information about the minority class (or classes). If an imbalanced training dataset is fed into a model, the output will be biased, and in many cases result in always predicting the majority class. In other words, a model trained with an imbalanced dataset tends to be more sensitive to detecting the majority class and less sensitive to the minority class. For example, in the case of the fraud detection model, where most of the transactions are not fraudulent, if the model is trained with imbalanced data, the model might predict every transaction as genuine. Yet in these models, it is very important to discover the rarely occurring minority class members. Failure to discover these members can be costly and undermine the model's accuracy and usefulness. For example, failure to detect a fraudulent transaction can cost the financial institution money and failure to detect a rare cancer can be deadly for the patient.

Data-Level Approaches: Balancing an Imbalanced Dataset

Various approaches have been introduced to deal with class imbalance issues. Some of these approaches are algorithmic approaches and others are data-level approaches. Concerning the data-level approaches, it has been observed that machine learning algorithms overcome class imbalance issues when the number of members of each class is roughly equal. Therefore, it is desirable to train classification models using balanced training datasets. Depending on the application, a balanced dataset can have different class distributions. For example, in some applications, a balanced dataset can have an even distribution between class members, e.g., 50% to 50%. As another example, in some applications, a balanced dataset can have at 60% to 40% distribution, or even 90% to 10%.

Many techniques have been proposed to deal with imbalanced datasets in training classification models. Cost-sensitive learning and sampling are two of these techniques. The first approach is cost-sensitive learning. When determining performance of a machine learning algorithm, accuracy of predictions seems to be a factor. However, it is helpful to take into account additional factors because some types of misclassifications may be worse than others. For example, in fraud applications, misclassifying a genuine transaction as fraudulent can be inconvenient, but would not impose financial burden on the company. Yet, misclassifying a fraudulent transaction as a genuine transaction can cause financial liability. As such, cost-sensitive learning takes the cost of every type of error into account so as to avoid the costliest of errors.

For example, in some applications, no cost is associated with correctly classifying an outcome correctly, e.g., correctly identifying a cancer patient as cancer or correctly identifying a healthy person as healthy. But incorrectly classifying a minority class member can be costlier than incorrectly identifying a majority class member, e.g., misclassification of a cancer patient as healthy can be costlier. Cost-sensitive learning seeks to minimize the total cost, and when misclassification costs are known the best metric for evaluating classifier performance can be total cost.

However, the cost-sensitive approach cannot be applied to every application because the misclassification costs are often unknown. Moreover, this approach cannot be implemented in every learning algorithm. In other words, the cost-sensitive approach is not a wrapper-based method as it has to be embedded in the learning algorithm. Therefore, for many applications, sampling seems to be the more appropriate approach.

There are various sampling techniques for balancing an imbalanced training dataset (or dataset). Oversampling, undersampling or a combination of the two are only a few examples of such sampling techniques. These techniques can be used to change the class distribution of a training dataset or to correct a bias in the training dataset. Oversampling will multiply the minority class members in the training dataset so that the training dataset is balanced (or oversampling will multiply selection of the minority class members so that a balanced sample dataset is collected). Undersampling, on the other hand, will discard the majority class members in the training dataset so that the training dataset is balanced (or undersampling will decrease selection of the majority class members so that a balanced sample dataset is collected).

For example, a dataset can include 100 variable data points. A feature of each data point can be gender. As such, these variables can be distributed between two known classes: men and women. Assume that the ratio of men to women is 9:1, i.e., for every 9 men, there is 1 woman in the dataset. Oversampling in this context can include copying the women data points 8 times so that the dataset is evenly distributed between men and women, i.e., the distribution ratio is 1:1. Undersampling in this context can include sampling only 1 man for every selection of a woman, e.g., sampling 10 men and 10 women. In the undersampling scenario, the ratio is 1:1.

There are several benefits to utilizing sampling techniques in addressing imbalanced datasets. Many highly skewed datasets are enormous and the size of the training set must be reduced in order for learning to be feasible. In these cases, undersampling seems to be a reasonable, and valid, strategy. There are also drawbacks associated with both sampling techniques. With oversampling, by making exact copies of existing examples, the machine learning algorithm makes overfitting likely. In fact, it is quite common for an algorithm to generate a classification rule to cover a single, replicated, example. Undersampling discards potentially useful data, and hence, this technique makes the training dataset less valuable.

To overcome these shortcomings, other sampling techniques have been proposed. For example, hybrid sampling techniques which combine oversampling and undersampling, Random Under-Sampling, Random Over-Sampling, Cluster-Based Over Sampling, Synthetic Minority Oversampling Technique and Modified synthetic minority oversampling technique are a few examples of these sampling techniques.

Nevertheless, the challenge with sampling techniques is that prior to training and testing a model, one would not know which sampling technique generates the training dataset which trains the best preforming model. Depending on the specific sampling technique, one might get a better or worse performance on a machine learning model. However, training and testing a model can be time-consuming and resource intensive.

In an example embodiment of this disclosure, when a new dataset is received, a server makes at least one recommendation as to what sampling technique can be the most effective sampling technique for the dataset. This sampling technique can be recommended based on prior performance of a model trained with a similar dataset. The datasets can be similar in that they have similar metadata.

In this disclosure, various embodiments pertaining to binary classification models are described. However, this disclosure is not limited to binary classification models, and the teachings herein can be implemented in non-binary classification models as well other models.

Datasets and Metadata

In an example embodiment, a server that includes a database is provided. The database can include several datasets. Each dataset can include variables and features for the variables. Each dataset can also include metadata associated with the dataset. The metadata can be at least one statistical measure for variables or features of the variables included in the dataset. For example, the metadata for a dataset can be one or more of the following: average, median, minimum, maximum, standard deviation, variance, correlation and covariance. These metrics can be calculated for the variables and/or features of the dataset. As another example, the metadata can include Frequency Analysis (FFTs). Frequency Analysis can be word distributions, letter distributions, frequency of waves, skewness, etc. The metadata can include a dictionary of several statistical measures mentioned above along with their respective weights. In an example embodiment, the metadata can be a correlation or covariance between two features of the dataset. The metadata can also be a combination or a weighted average of several statistical measures, e.g., a weighted average of median and mean. The metadata can also include multiple values, e.g., a vector. Defining metadata for a dataset is useful because metadata can provide for point matching between different datasets in the database. In other words, the metadata can provide an objective measure for determining whether two different datasets are similar for machine learning purposes.

FIG. 1 shows a dataset 100 including variables and features according to an example embodiment. In this example embodiment, the dataset includes a list of 100 individuals as variables 101. The dataset also includes several features for the individuals. For example, the dataset includes each individual's age 102 and family history 103, i.e., whether anyone has had cancer in the family. The dataset also includes a target 104 (or label) for each individual, i.e., whether each individual has cancer.

In an example embodiment, the database can store various metadata for each dataset stored in the database. For example, for the dataset 100, a piece of metadata can be the average age of the individuals, i.e., the average of all ages 102 for individuals 1-1000. In this case, this average is 38. Another piece of metadata can be the minimum age for the individuals. In this case, the minimum of all ages 102 for the individuals 1-1000 is 18 (not shown in the figure). In this embodiment, the dataset 100 was previously used to train a model, and the trained model received a performance value. Accordingly, the metadata of the dataset and the performance value of the model are stored in the database in association with the dataset.

In the context of this disclosure, a dataset can be a training dataset, a validation dataset or a test dataset.

Performance of the Dataset

In an example embodiment, a performance or evaluation value is associated with each dataset stored in the database. The performance or evaluation value can be a measure of efficacy of a model trained with the dataset. There are several performance metrics for measuring a classification model's performance. Accuracy, precision, recall, specificity and area under the curve are some examples of these performance metrics.

In an example embodiment, the model is tested with a test dataset to evaluate the model's performance. The targets can be positive or negative. The model's predictions can be identified as true positives, true negatives, false positives and false negatives. A true positive prediction is a prediction that correctly identifies a positive data point. A true negative prediction is a prediction that correctly identifies a negative data point. A false positive prediction is a prediction that incorrectly identifies a negative data point as positive. A false negative prediction is a prediction that incorrectly identifies a positive data point as negative.

FIG. 2 shows a confusion matrix 200 for a cancer detection model according to an example embodiment. In this example embodiment, the cancer detection model is trained to detect cancer in patients. In order to evaluate performance of the model, the model's predictions are classified into four groups: true positive, false positive, true negative and false negative. A true positive prediction identifies a cancer patient as cancer or positive. A true negative prediction identifies a healthy person as healthy or negative. A false positive prediction (mis)identifies a healthy person as cancer. A false negative prediction (mis)identifies a cancer patient as healthy.

Ideally, a model should not make any false or inaccurate predictions. However, in practice, every model can make inaccurate predictions. Depending on the specific needs or applications of the model, the goal of the model is to minimize one or both of false positive and false negative predictions for the model. For example, for cancer detection, minimizing the false negatives can be the objective because the consequence of misdiagnosing a cancer patient is severe. However, for spam emails, minimizing the false positives is desirable because incorrectly identifying an important email as spam can be consequential.

In an example embodiment, an "accuracy" rate can be used as the performance metric for the trained model. To calculate the accuracy rate, the number of correct predictions made by the model can be divided by all predictions made by the model, i.e., the fraction of true positives plus true negatives over the true and false positives plus the true and false negatives. The accuracy rate is the most useful when the classes of data are equally divided. However, the accuracy rate might not provide a useful metric for imbalanced datasets.

In an example embodiment, a "precision" rate can be used as the performance metric for the trained model. Precision rate is a measure that indicates what proportion of the positive predictions are actually correct predictions. In order to calculate the precision rate, one has to divide the true positive predictions by the total number of positive predications (i.e., true and false positives).

In an example embodiment, a "recall" rate can be used as the performance metric for the trained model. Recall rate indicates what proportion of the total positive data points were identified by the model as positives (i.e., true positives). The total positive data points are the sum of true positives and false negatives. Therefore, in order to calculate the recall rate, one has to divide the number true positives by the sum of true positives and false negatives.

The recall rate can measure a model's performance with respect to false negatives, i.e., how many were missed. On the other hand, the precision rate can measure a model's performance with respect to false positives, i.e., how many were caught. The precision rate can be about being precise. For example, even if the model captures only one cancer case, and the model captured it correctly, then the model is 100% precise. The recall rate is more about capturing all cases that have "cancer" with the answer as "cancer." So, if the model always predicts every case as "cancer," the model has a 100% recall rate.

In an example embodiment, "specificity" rate can be used as the performance metric for the trained model. The specificity rate can indicate what proportion of the total negative data points were predicted by the model as negatives (i.e., true negatives). The total negative data points are the sum of true negatives and false positives. Therefore, in order to calculate the specificity rate, one has to divide the number true negatives by the sum of true negatives and false positives. The specificity rate is the exact opposite of the recall performance metric.

Figure 3:
FIG. 3 shows another confusion matrix for a cancer detection model according to an example embodiment.

FIG. 3 shows a confusion matrix 300 for a cancer detection model according to an example embodiment. In this example embodiment, the records for 1000 patients is fed to the cancer detection model. In this dataset, there are 7 cancer patients and 993 healthy individuals. The model has predicted 8 cancer patients and 992 healthy individuals. In the model's predictions, there are 6 true positive predictions, 2 false positive predictions, 991 true negative predictions and 1 false negative prediction. The accuracy rate for this model is 997 divided by 1000 or 99.7%. The precision rate for this model is 6 divided by 8 or 75%. The recall rate for this model is 6 divided by 7 or 85.7%. The specificity rate for this model is 991 divided by 993 or 99.7%.

In an example embodiment, the performance metric can be a misclassification rate of the model. To calculate the misclassification rate, the number of incorrect predictions made by the model can be divided by all predictions made by the model, i.e., the fraction of false positives plus false negatives over the true and false positives plus the true and false negatives.

In an example embodiment, the performance metric can be a prevalence rate of the model. The prevalence rate indicates how many members of a class are in a dataset. The prevalence rate can be calculated by dividing the number class members by the number of all of the variables.

In an example embodiment, the performance value can be the calculated value according to one of the accuracy, precision, recall or specificity rate. In another example embodiment, the performance value can be a combination of two or more values calculated according to these performance metrics. For example, the performance value can be a weighted average of the values calculated according to the precision and recall rates, e.g., the sum of the precision and recall rates divided by 2. In this example, each of the values calculated according to the precision and recall rates are given the same weight. In the example embodiment of FIG. 3, if the precision and recall rates are weighted equally, the weighted average of these metrics is 80.3%. The weighted average of the values calculated according to the precision and recall rates can be the F-score for the model.

As another example, the performance value can be a harmonic mean of the precision and recall rates. That is:

2×(precision×recall)÷(precision+recall).

This performance value can be the F1 score for the model. The harmonic mean for two nearly equal numbers is a number close to the average of the two numbers. However, when the numbers are different, the harmonic mean is closer to the smaller number as compared to the larger number. In the example embodiment of FIG. 3, the harmonic mean of the precision and recall rates is 79.9%.

In an example embodiment, the performance value can be an area under a curve. The curve can be a receiver operating characteristics (ROC) curve. The ROC curve is a graph showing the performance of a classification model at all classification thresholds. This curve plots two parameters: True Positive Rate ("TPR") and False Positive Rate ("FPR"). The TPR is the same as the recall rate. It is equal to the number of true positive predictions divided by the total positives, i.e., the true positives plus false negatives. The FPR is defined as the number of false positive predictions over the total negative predictions, i.e., false positives plus true negatives.

An ROC curve is a graph which has FPR on its x-axis and TPR on its y-axis at different classification threshold values of the model. A classification model can determine a prediction probability which indicates the system's certainty that the given observation belongs to the positive class. The user can define a classification threshold value for predictions of the model. This threshold value specifies a minimum prediction probability for the model to assign an observation to the positive class. Any observation with prediction probability higher than the threshold value can then be predicted as the positive class and probability lower than the threshold value can be predicted as the negative class. By lowering the classification threshold for a model, the likelihood of classifying an observation as positive increases, and thus, the numbers of both false positives and true positives increases.

The area under the ROC curve is known as "AUC." AUC provides an aggregate measure of performance across all possible classification thresholds. Because TPR and FPR range between 0 and 1, AUC ranges in value from 0 to 1. An AUC of 0 indicates that all the predictions of the model are wrong and an AUC or 1.0 indicates that all of the predictions of the model are accurate. Since a random classifier predicts half of the outcomes correctly, an AUC value close to 0.5 indicates a relatively inaccurate classifier. AUC can provide a useful performance value because it is scale-invariant and classification-threshold-invariant.

In an example embodiment, the performance metric can be the logarithmic loss ("log loss") metric. Log loss measures the performance of a classification model where the prediction input is a probability value between 0 and 1. The goal of a model is to minimize this value.

In an example embodiment, the performance value can be determined based on a F-Beta score. The F-Beta score can be calculated as follows:

$$[(1+\beta^2)\times(\text{precision}\times\text{recall})]\div[(\beta\times\text{precision})+\text{recall})]$$

In an example embodiment, the performance metric can be the Positive Predictive Value (PPV). PPV takes prevalence into account.

In an example embodiment, the performance metric can be the Null Error Rate (NER). NER is an indicator of how often the model would be wrong if it always predicted the majority class. This can be a useful baseline metric to compare a classifier against.

In an example embodiment, the performance metric can be the Cohen's Kappa. Cohen's Kappa can measure how well the classifier performed as compared to how well it would have performed simply by chance. In other words, a model will have a high Kappa score if there is a big difference between the accuracy rate and the NER.

Finding the Match Dataset

In an example embodiment, a server is provided with a new dataset. The server can divide up the dataset into a training dataset, a validation dataset and a test dataset. The dataset can be skewed, i.e., the number of class members of one of the classes can exceed the number of class members of another class. The server can propose a sampling technique to the user for sampling the dataset (or the training dataset) so that the class distribution becomes more balanced. There are several techniques for the server to propose a sampling technique. For example, a server can propose a sampling technique based on a probability and accuracy of the technique.

In one embodiment, a database can include various datasets. Each dataset can have a performance value associated with the dataset. The server can calculate an average performance value of each sampling technique across the database. Subsequently, the server can recommend the highest ranked sampling techniques based on the average performance values.

In another embodiment, a database can include various datasets. Each dataset can have metadata associated with the dataset. In one example, the server can create various categories and assign each dataset to at least one of the categories based on the metadata associated with the dataset. The server can also determine the sampling techniques which are the most successful for each category. For example, for each category, the server can determine the sampling techniques that have received the highest AUC scores. Once a new dataset is received, the server can calculate metadata for the new dataset. The server can further determine which category is similar to the new dataset. This determination can be based on the metadata associated with the new dataset and metadata associated with the category (e.g., a typical profile of a dataset included in the category). Once the server determines which category is similar to the new dataset, the server can recommend the sampling techniques that were successful for the category.

In another example, the server can include a user interface. The user interface can receive input from a user. The input can be information relating to a specific dataset. For example, a user can define a purpose for a dataset, e.g., the user can specify that a dataset was used for fraud detection of credit card transactions. The server can assign the datasets to several categories based on the user input and optionally the metadata defined for each dataset. Once a new dataset is received, the server can receive input from the user relating to the new dataset. The server can also optionally calculate metadata for the new dataset. Based on the input information and/or the metadata for the new dataset, the server can determine which category is similar to the new dataset and recommend sampling techniques that work best for the category.

In an example embodiment, the server can propose a sampling technique based on the prior sampling techniques implemented for similar datasets. Specifically, the server can include a database storing various datasets. Each dataset can include metadata and optionally performance data (or at least one performance value) associated with the dataset. The metadata can represent a profile of the dataset and assist the server in choosing a similar dataset. The performance data can indicate a measure of success for the model which was trained with the dataset stored in the database, e.g., how accurately the model was able to predict the labels.

The server can propose a sampling technique based on at least one metric of the new dataset and the metrics of the datasets stored in the database. For example, the server can first look for datasets in the database which are similar to the new dataset. In order to do so, the server can calculate various metadata for the new dataset and then compare these metadata with those of the datasets stored in the database. The server can determine a matching score for each dataset stored in the database. For all or some of the highest scored datasets, the server can further consider the performance data for each dataset. Based the matching score and optionally the performance data, the server can determine the closest match (or matches) to the new dataset, and the server can further make a recommendation. The recommendation can be the sampling technique used for the highest scored dataset. In some embodiments, the matching score can take performance data into account.

This technique for proposing sampling techniques is beneficial because it has been observed that similar datasets respond the same to similar sampling techniques. Therefore, by searching the database for previously implemented sampling techniques, the server is in fact taking advantage of all the knowledge available without having to guess which sampling technique would work the best for any given dataset. This technique is simpler and faster than other techniques available in the prior art as it focuses on the most efficient techniques available from prior use cases.

Figure 4:
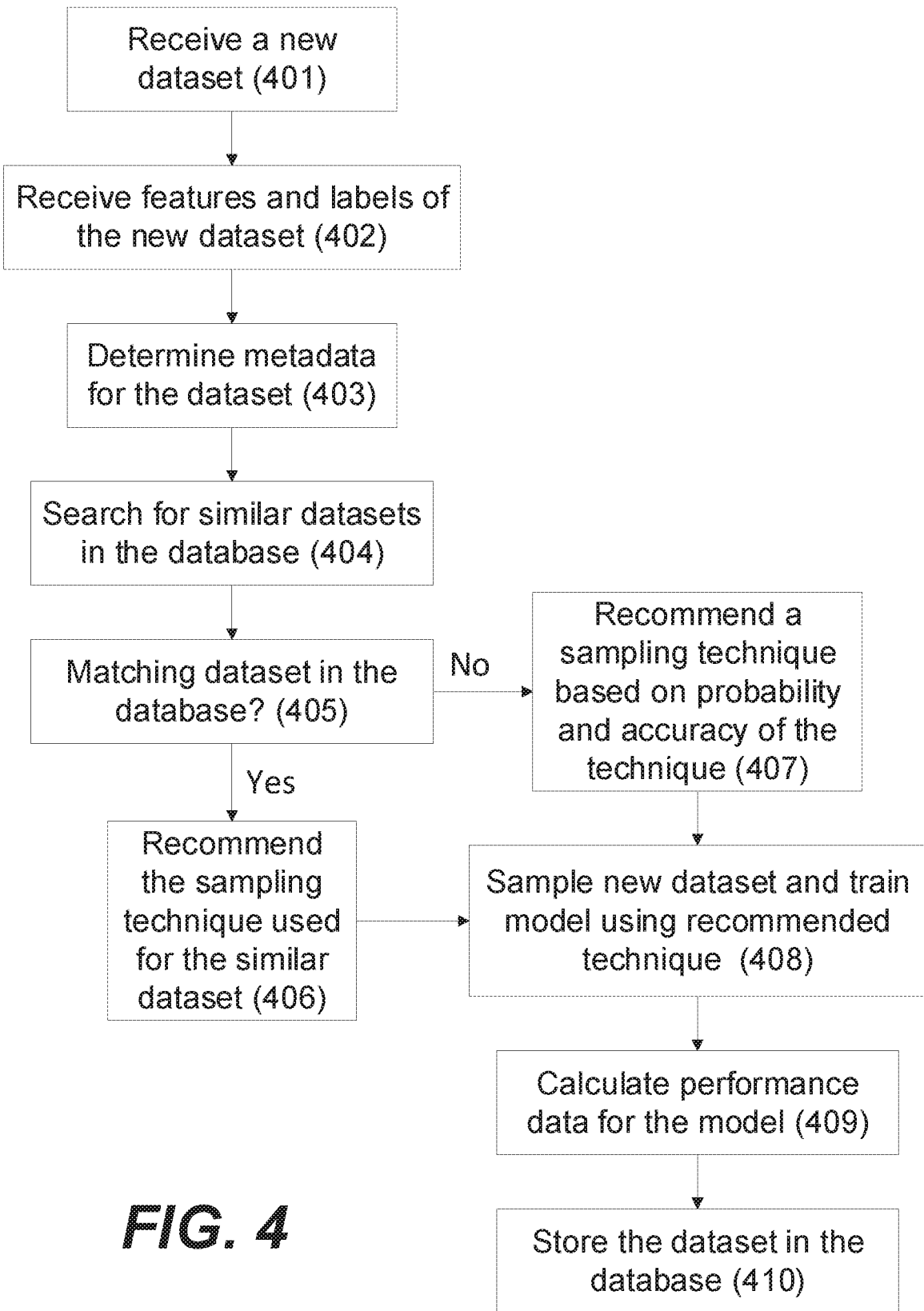
FIG. 4 shows an example flow process for a sampling technique recommendation system.

FIG. 4 shows an example flow process for a sampling technique recommendation system. In this example embodiment, a server is provided which includes a database. In step 401, the server can receive a new dataset from a user of the system. In step 402, the user can specify various information about the new dataset. For example, the user can specify the dataset's variables, features and labels (or targets). In an example credit card transaction dataset, the transaction numbers can be the variables for the dataset. The features of the dataset can include the customer's median purchase amount, the types of stores the customer has shopped at, the average store expenditure of the customer, etc. The label or target of the dataset can be an indicator of whether the transaction was fraudulent.

Subsequently, in step 403, the server can determine metadata for the new dataset. For example, the server can determine the standard deviation of one of the features of the new dataset. As another example, the server can determine a correlation or covariance value between two of the features of the dataset. In the case of the credit card transactions, for example, the server can determine the correlation between a user's median transaction amount and the user's average store expenditure.

In step 404, the server can search the database for datasets with similar profiles or metadata. For example, the server can search for datasets that have the same or similar standard deviation for one of its features as the new dataset. The standard deviation of two datasets can be similar if they are within a threshold value or a percentage of each other. As another example, the server can search for a dataset that has a correlation value between two of its features. If the correlation value is similar to the new dataset's correlation value, the server selects the dataset. In some embodiments, the metadata for a dataset can be a composite number including two or more metrics. For example, the metadata can be a weighted average of a median and mean of a feature of the dataset. In these embodiments, in step 404, the server can look for datasets which include the same or similar metadata as the new dataset.

In some embodiments, prior to searching for similar datasets, the server can limit the search to datasets which include performance data associated with them. The server can require the performance data to be below or above a threshold value. For example, the server can require the datasets to include a minimum AUC score of 0.80 before the server considers the dataset's metadata. In other embodiments, the server can impose a performance data restriction after searching the database for similar datasets. For example, after retrieving the most relevant datasets, the server can consider only the datasets which include an AUC score of at least 0.80 associated with them. In yet another embodiment, the server does not consider performance data in recommending sampling techniques to the user.

In step 405, the server determines whether any similar datasets are found in the database. If similar datasets are found, in step 406, the server can recommend the sampling technique(s) used for the similar dataset(s). If no similar datasets are found, in step 407, the server can recommend a sampling technique based on the probability and accuracy of the technique.

In step 408, the server can sample the new dataset based on one or more of the recommended sampling techniques. For example, in one embodiment, the server can use one of the sampling techniques recommended in one of the steps 406 and 407. As another example, the server can select the highest ranked recommendation in one or both of the steps 406 and 407 as the sampling technique. As another example, the server can allow a user to select the sampling technique recommended in one or both of the steps 406 and 407. As yet another example, regardless of whether the answer to the question in step 405 is yes or no, the server can perform both steps 406 and 407, and select a sampling technique based on both recommendations in steps 406 and 407, e.g., the server can select the technique that is recommended in both steps.

In step 408, a machine learning module of the server can train a model using the sampled dataset. In step 409, the server can calculate the performance data for the trained model. For example, the server can determine the AUC score for the model. In step 410, the server can store the dataset in the database. The server can further store the dataset's metadata and performance data in the database for future search and recommendation.

Technical Implementation of the Sever

Figure 5:
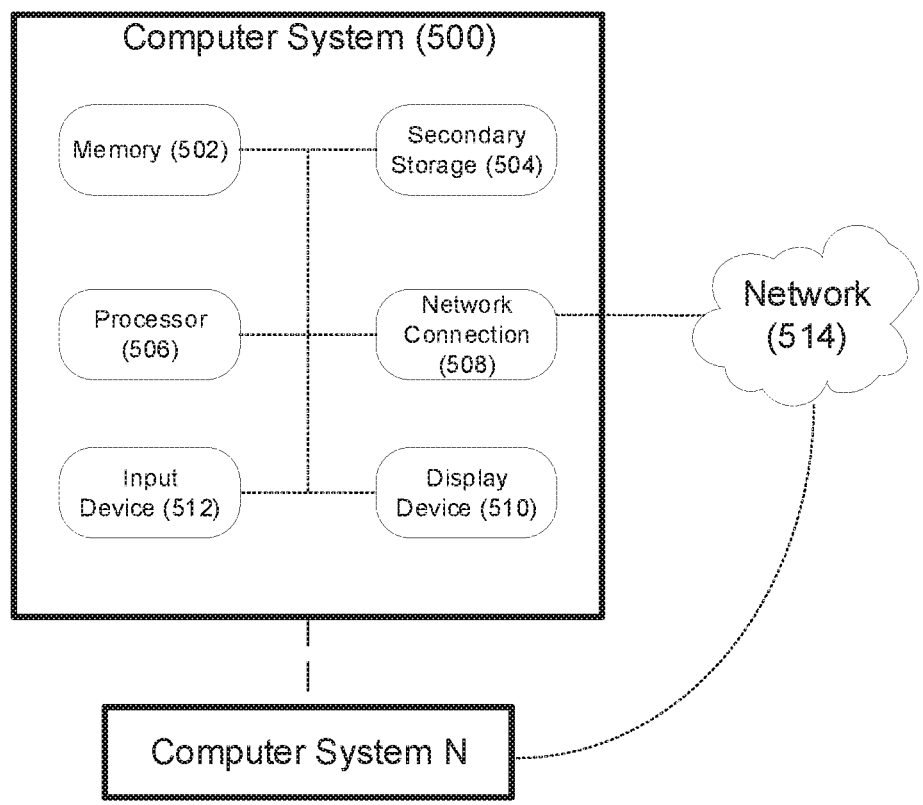
FIG. 5 illustrates exemplary hardware components for a server.

FIG. 5 illustrates exemplary hardware components a server. A computer system 500, or other computer systems similarly configured, may include and execute one or more subsystem components to perform functions described herein, including the steps of various flow processes described above. Likewise, a mobile device, a cell phone, a smartphone, a laptop, a desktop, a notebook, a tablet, a wearable device, a server, etc., which includes some of the same components of the computer system 500, may run an application (or software) and perform the steps and functionalities described above. Computer system 500 may connect to a network 514, e.g., Internet, or other network, to receive inquires, obtain data, and transmit information and incentives as described above.

The computer system 500 typically includes a memory 502, a secondary storage device 504, and a processor 506. The computer system 500 may also include a plurality of processors 506 and be configured as a plurality of, e.g., bladed servers, or other known server configurations. The computer system 500 may also include a network connection device 508, a display device 510, and an input device 512.

The memory 502 may include RAM or similar types of memory, and it may store one or more applications for execution by processor 506. Secondary storage device 504 may include a hard disk drive, floppy disk drive, CD-ROM drive, or other types of non-volatile data storage. Processor 506 executes the application(s), such as those described herein, which are stored in memory 502 or secondary storage 504, or received from the Internet or other network 514. The processing by processor 506 may be implemented in software, such as software modules, for execution by computers or other machines. These applications preferably include instructions executable to perform the system and subsystem component functions and methods described above and illustrated in the FIGS. herein. The applications preferably provide graphical user interfaces (GUIs) through which users may view and interact with subsystem components.

The computer system 500 may store one or more database structures in the secondary storage 504, for example, for storing and maintaining the information necessary to perform the above-described functions. Alternatively, such information may be in storage devices separate from these components.

Also, as noted, processor 506 may execute one or more software applications to provide the functions described in this specification, specifically to execute and perform the steps and functions in the process flows described above. Such processes may be implemented in software, such as software modules, for execution by computers or other machines. The GUIs may be formatted, for example, as web pages in HyperText Markup Language (HTML), Extensible Markup Language (XML) or in any other suitable form for presentation on a display device depending upon applications used by users to interact with the computer system 500.

The input device 512 may include any device for entering information into the computer system 500, such as a touch-screen, keyboard, mouse, cursor-control device, microphone, digital camera, video recorder or camcorder. The input and output device 512 may be used to enter information into GUIs during performance of the methods described above. The display device 510 may include any type of device for presenting visual information such as, for example, a computer monitor or flat-screen display (or mobile device screen). The display device 510 may display the GUIs and/or output from sub-system components (or software).

Examples of the computer system 500 include dedicated server computers, such as bladed servers, personal computers, laptop computers, notebook computers, palm top computers, network computers, mobile devices, or any processor-controlled device capable of executing a web browser or other type of application for interacting with the system.

Although only one computer system 500 is shown in detail, system 500 may use multiple computer systems or servers as necessary or desired to support the users and may also use back-up or redundant servers to prevent network downtime in the event of a failure of a particular server. In addition, although computer system 500 is depicted with various components, one skilled in the art will appreciate that the system can contain additional or different components. In addition, although aspects of an implementation consistent with the above are described as being stored in a memory, one skilled in the art will appreciate that these aspects can also be stored on or read from other types of computer program products or computer-readable media, such as secondary storage devices, including hard disks, floppy disks, or CD-ROM; or other forms of RAM or ROM. The computer-readable media may include instructions for controlling the computer system 500, to perform a particular method, such as methods described above.

The present disclosure is not to be limited in terms of the particular embodiments described in this application, which are intended as illustrations of various aspects. Many modifications and variations can be made without departing from its spirit and scope, as may be apparent. Functionally equivalent methods and apparatuses within the scope of the disclosure, in addition to those enumerated herein, may be apparent from the foregoing representative descriptions. Such modifications and variations are intended to fall within the scope of the appended representative claims. The present disclosure is to be limited only by the terms of the appended representative claims, along with the full scope of equivalents to which such representative claims are entitled. It is also to be understood that the terminology used herein is for the purpose of describing particular embodiments only, and is not intended to be limiting.

The invention claimed is:

1. A method comprising:
receiving, by a transceiver of a server, a first dataset including labeled data points belonging to two classes, a first number of labeled data points belonging to a first class is larger than a second number of labeled data points belonging to a second class;
calculating, using a processor of the server, a first metadata value for the first dataset, wherein the first metadata value is a weighted average of a standard deviation, an average and a median of the labeled data points;

selecting, using the processor, a selected sampling technique associated with a selected dataset, wherein:
the selected dataset is one of a plurality of datasets stored in a database;
each of the plurality of datasets includes selected data points and is associated with a metadata value, a sampling technique and a performance value, wherein the metadata value is another weighted average of another standard deviation, another average and another median of the selected data points of the respective dataset;
the performance value is a measure of efficacy of a predictive model trained with the respective dataset and is specificity; and
the first metadata value matches the metadata value associated with the selected dataset; and sampling, using the processor, the first dataset using the selected sampling technique to generate a new subset, wherein the selected sampling technique is a combination of Random Under-Sampling of the first class of data points by discarding a plurality of the labeled data points of the first class and Modified Synthetic Minority Over-Sampling the second class of data points by multiplying a plurality of the labeled data points of the second class.

2. The method of claim 1, wherein the selected sampling technique is one of the following:
the sampling technique associated with the selected dataset; or
based on the sampling technique associated with the selected dataset.

3. The method of claim 1, wherein the performance value associated with the selected dataset is higher than a threshold value.

4. The method of claim 3, wherein the performance value is additionally one of accuracy, precision, recall, or area under a curve.

5. The method of claim 4, wherein the performance value is an area under a curve and the threshold value is 0.8.

6. The method of claim 1, further comprising providing the new subset to a classifier as training data.

7. The method of claim 6, wherein the classifier uses the training data to train a predictive model.

8. The device of claim 1, wherein the selected sampling technique further includes one or a combination of the following:
Synthetic Minority Over-sampling Technique; or
Random Over-Sampling.

9. The method of claim 1, wherein the sampling technique is:
Synthetic Minority Over-sampling Technique;
Modified synthetic minority oversampling technique;
Random Under-Sampling; or
Random Over-Sampling.

10. The method of claim 1, wherein the first metadata value matches the metadata value associated with the selected dataset only if:
the first metadata value is equal to the metadata value; or
the first metadata value is within a tolerance range of the metadata value.

11. A device comprising:
a processor, a memory, a reader, a transceiver and a display, wherein:

the transceiver is configured to receive a payment request including a payment amount and an account number from a terminal; and
the transceiver is configured to transmit a message to the terminal, wherein:
the message is created by the processor using a predictive model and the predictive model was trained using training data, the training data was a subset of a first dataset sampled according to a selected sampling technique;
the selected sampling technique is associated with a selected dataset, wherein in the selected dataset, a first number of labeled data points belonging to a first class is larger than a second number of labeled data points belonging to a second class; and
the selected dataset is one of a plurality of datasets stored in a database, each dataset including selected data points and being associated with a sampling technique, a metadata value and a performance value, wherein:
the performance value is a measure of efficacy of a model trained with the sampling technique associated with the respective dataset and is specificity;
the metadata value is a weighted average of a standard deviation, an average and a median of the selected data points of the respective dataset;
the selected sampling technique is a combination of Random Under-Sampling of the first class of data points by discarding a plurality of the labeled data points of the first class and Modified Synthetic Minority Over-Sampling the second class of data points by multiplying a plurality of the labeled data points of the second class; and
a first metadata value of the first dataset matches the metadata value of the selected dataset.

12. The device of claim 11, wherein the selected sampling technique is:
the sampling technique associated with the selected dataset; or
based on the sampling technique associated with the selected dataset.

13. The device of claim 11, wherein the performance value associated with the selected dataset is higher than a threshold value.

14. The device of claim 11, wherein the selected sampling technique is one or more of the following:
Synthetic Minority Over-sampling Technique; or
Random Over-Sampling.

15. A system comprising:
a server; and
a terminal including a processor, a memory, a reader, a transceiver and a display, wherein:
the reader is configured to scan a payment card for an account number;
the transceiver is configured to transmit a payment request including a payment amount and the account number to the server; and
the transceiver is configured to receive a message from the server, wherein:
the message is created by the server using a predictive model and the predictive model was trained using training data, the training data was a subset of a first dataset sampled according to a selected sampling technique;

the selected sampling technique is associated with a selected dataset, wherein in the selected dataset, a first number of labeled data points belonging to a first class is larger than a second number of labeled data points belonging to a second class;

the selected dataset is one of a plurality of datasets stored in a database, each dataset including selected data points and being associated with a sampling technique, a metadata value and a performance value;

the performance value is a measure of efficacy of a model trained with the sampling technique associated with the respective dataset and is specificity;

a first metadata value of the first dataset matches the metadata value of the selected dataset;

wherein the selected sampling technique is a combination of Random Under-Sampling of the first class of data points by discarding a plurality of the labeled data points of the first class and Modified Synthetic Minority Over-Sampling the second class of data points by multiplying a plurality of the labeled data points of the second class; and the first metadata value is a weighted average of a standard deviation, an average and a median of the selected data points of the respective dataset.

* * * * *